(12) United States Patent
Furukawa (10) Patent No.: US 12,541,841 B2
(45) Date of Patent: Feb. 3, 2026

(54) INFORMATION PROCESSING APPARATUS AND INFORMATION PROCESSING METHOD

(71) Applicant: CANON KABUSHIKI KAISHA, Tokyo (JP)

(72) Inventor: Hiromu Furukawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 322 days.

(21) Appl. No.: 18/339,297

(22) Filed: Jun. 22, 2023

(65) Prior Publication Data
US 2024/0078660 A1    Mar. 7, 2024

(30) Foreign Application Priority Data

Sep. 2, 2022    (JP) .................... 2022-140202

(51) Int. Cl.
| | | |
|---|---|---|
| *G06T 7/00* | (2017.01) | |
| *G06T 5/50* | (2006.01) | |
| *G06T 7/11* | (2017.01) | |

(52) U.S. Cl.
CPC .............. *G06T 7/001* (2013.01); *G06T 5/50* (2013.01); *G06T 7/11* (2017.01); *G06T 2207/20221* (2013.01)

(58) Field of Classification Search
CPC ... G06T 7/001; G06T 5/50; G06T 7/11; G06T 2207/20221; G06T 7/74; G06T 7/0002; G06T 2207/20132
See application file for complete search history.

(56) References Cited

U.S. PATENT DOCUMENTS

| | | | | |
|---|---|---|---|---|
| 10,861,145 | B2 * | 12/2020 | Honda ............... | G01N 21/8851 |
| 10,964,080 | B2 * | 3/2021 | Oshikiri .................. | G06T 11/60 |
| 10,989,672 | B2 * | 4/2021 | Kaneko ............. | G01N 21/8851 |
| 11,144,590 | B2 * | 10/2021 | Karube ................. | G06T 7/0002 |
| 11,320,972 | B2 * | 5/2022 | Adachi ............... | G06F 3/04842 |
| 12,182,196 | B2 * | 12/2024 | Takahashi ............. | G06F 16/532 |

OTHER PUBLICATIONS

T. Kawada et al., "Using AR technology, Effective Maintenance of Social Infrastructure using AR Technique", 2015, Mitsubishi Electric Technical Report and vol. 89, No. 2, [Search on Apr. 21, 2022], Internet <URL: https://www. giho.mitsubishielectric.co.jp/giho/pdf/2015/1502108.pdf> (8 pages).

* cited by examiner

*Primary Examiner* — Gregory M Desire
(74) *Attorney, Agent, or Firm* — Venable LLP

(57) ABSTRACT

An information processing apparatus executes instructions to search for inspection information in which a first image in an inspection target is captured and a defect region of the first image are associated, the inspection information corresponding to a second image in which the inspection target is captured, to extract a region corresponding to the second image from the searched information corresponding to the second image, to generate information for presenting the extracted region corresponding to the second image so that the region is comparable against the second image, and to associate and to save, as inspection information, the first image and the defect region of the first image. The saved inspection information corresponding to the second image is searched for, and a partial region of the first image corresponding to the second image and a partial defect region is included in the partial region are extracted from the searched inspection information.

13 Claims, 7 Drawing Sheets

INFORMATION PROCESSING APPARATUS AND INFORMATION PROCESSING METHOD

CROSS REFERENCE TO PRIORITY APPLICATION

This application claims the benefit of Japanese Patent Application No. 2022-140202, filed Sep. 2, 2022, which is hereby incorporated by reference herein in its entirety.

BACKGROUND OF THE INVENTION

Field of the Invention

The present disclosure relates to techniques for displaying inspection results of an inspection target so as to be comparable.

Description of the Related Art

As a method for inspecting infrastructure, there are methods of performing image analysis processing on an image in which an inspection target structure is captured, and performing image processing using a learned model generated by machine learning.

In addition, a technique has been proposed to support the checking of inspection information by a user by displaying the current inspection results and past inspection results of the same structure so that they can be compared (Takushi Kawada, Kanya Watanabe, Takeo Kawaura, "Effective Maintenance of Social Infrastructure using AR Technique", Mitsubishi Electric Technical Report and Vol. 89, No. 2, 2015 [Search on Apr. 21, 2022], Internet <URL: https://www.giho.mitsubishielectric.co.jp/giho/pdf/2015/1502108.pdf>).

Image processing for detecting a defect in an image in which an inspection target is captured requires an image captured at a high-definition, and an image obtained by capturing the inspection target in the widest possible range is used in order to improve the efficiency of the inspection work. Therefore, if an inspection result obtained from an image captured at the site and a past inspection result are simply superimposed and displayed, for example, it is difficult to perform the confirmation work focusing on a region of interest, and there is a possibility that the confirmation work of the inspection results cannot be efficiently performed.

SUMMARY OF THE INVENTION

The present invention has been made in consideration of the aforementioned problems, and realizes techniques that enable efficient work for checking inspection results.

In order to solve the aforementioned problems, the present invention provides an information processing apparatus comprising a search unit configured to search for inspection information in which a first image in which an inspection target is captured and a defect region of the first image are associated, the inspection information corresponding to a second image in which the inspection target is captured, an extraction unit configured to extract a region corresponding to the second image from the inspection information corresponding to the second image searched for by the search unit, and a generation unit configured to generate information for presenting the region corresponding to the second image extracted by the extraction unit so that that the region is comparable against the second image.

In order to solve the aforementioned problems, the present invention provides an information processing method comprising searching for inspection information in which a first image in which an inspection target is captured and a defect region of the first image are associated, the inspection information corresponding to a second image in which the inspection target is captured, extracting a region corresponding to the second image from the inspection information corresponding to the searched for second image, and generating information for presenting the region corresponding to the extracted second image so that that the region is comparable against the second image.

In order to solve the aforementioned problems, the present invention provides a non-transitory computer-readable storage medium storing a program for causing a computer to execute an information processing method comprising searching for inspection information in which a first image in which an inspection target is captured and a defect region of the first image are associated, the inspection information corresponding to a second image in which the inspection target is captured, extracting a region corresponding to the second image from the inspection information corresponding to the searched for second image, and generating information for presenting the region corresponding to the extracted second image so that that the region is comparable against the second image.

According to the present invention, work to confirm inspection results can be carried out efficiently.

Further features of the present invention will become apparent from the following description of exemplary embodiments (with reference to the attached drawings).

DESCRIPTION OF THE EMBODIMENTS

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached draw-

First Embodiment

Hereafter, an embodiment in which the information processing apparatus of the present invention is applied to a computer apparatus used for inspection of infrastructure such as a concrete structure will be described.

In the first embodiment, an example of a system in which a computer apparatus operates as an information processing apparatus and displays an image obtained by capturing an image of an inspection target at a site and a past inspection result of the same inspection target so that they can be compared with each other on a client apparatus so that work for checking an inspection result can be performed efficiently will be described.

In the first embodiment, the "inspection target" is a concrete structure to be inspected, such as an automobile road, a bridge, a tunnel, or a dam. The information processing apparatus performs defect detection processing for detecting the presence or absence or state of a defect such as a crack using an image obtained by a user capturing an image of an inspection target. In the case of a concrete structure, for example, the term "defect" refers to cracking, floating, or spalling of concrete, or the like. In addition, "defect" encompasses efflorescence (crystalline deposit of salts), rebar exposure, rust, water leakage, water dripping, corrosion, breakage (deficiency), cold joint, deposition, rock pocket, and the like.

An "inspection image" is an image obtained by capturing an inspection target in the past, and is an image (a first image) for which an inspection result is already saved as inspection information. An "input image" is the newest image (a second image) obtained by capturing the same inspection target as an inspection image at the site by using the client apparatus.

In the present embodiment, assume that the image capturing range of the input image is smaller than the image capturing range of the inspection image.

<System Configuration>
First, a system including the information processing apparatus according to the first embodiment will be described with reference to FIG. 1.

Figure 1:
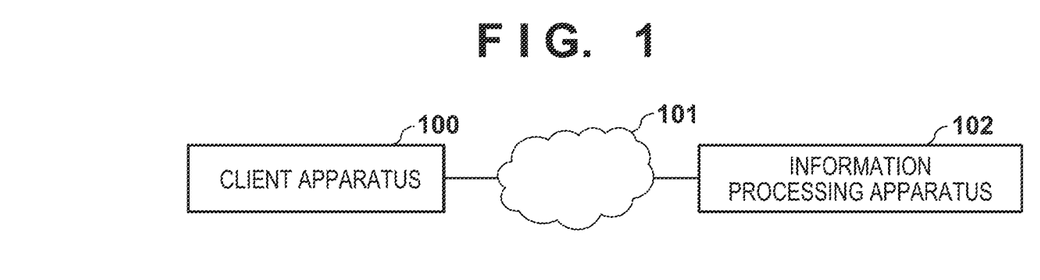
FIG. 1 is a system configuration according to a first embodiment.

FIG. 1 is a system configuration diagram according to the first embodiment.

In the system according to the first embodiment, a client apparatus 100 and an information processing apparatus 102 are communicably connected via a network 101.

The client apparatus 100 is an operation apparatus having a camera function that a user can carry and operate, and is, for example, a communication terminal such as a smart phone or an information processing terminal such as a tablet PC (personal computer).

The information processing apparatus 102 is a computer apparatus such as a desktop computer (PC) or a server computer.

The network 101 is an internal network such as a local area network (LAN), a wide area network (WAN) such as a 4G/LTE or 5G network, the Internet, or the like.

An input image obtained by capturing an inspection target at a site is transmitted from the client apparatus 100 to the information processing apparatus 102. The information processing apparatus 102 performs defect detection processing on the input image received from the client apparatus 100. Further, the information processing apparatus 102 generates a comparison result by which the input image received from the client apparatus 100 and a past inspection result of the same inspection target including the image capturing range of the input image can be compared, and transmits the comparison result to the client apparatus 100. The user displays the comparison result received from the information processing apparatus 102 in the client apparatus 100, and thereby it is possible to perform work for checking the inspection result of the inspection target.

Note that the defect detection processing may be performed by using a cloud-type service such as Software as a Service (SaaS).

<Hardware Configuration>
Next, a hardware configuration of the information processing apparatus according to the first embodiment will be described with reference to FIG. 2.

Figure 2:
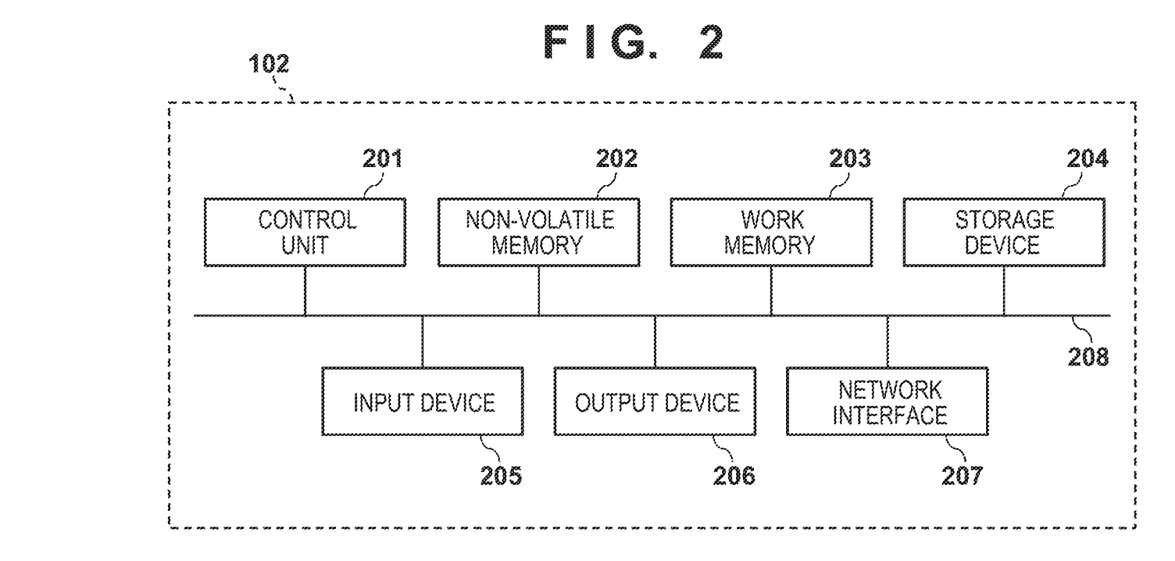
FIG. 2 is a block diagram illustrating a hardware configuration of an information processing apparatus according to the first embodiment.

FIG. 2 is a block diagram illustrating a hardware configuration of the information processing apparatus 102 according to the first embodiment.

In the first embodiment, a computer apparatus operates as the information processing apparatus 102. Note that the processing of the information processing apparatus according to the first embodiment may be realized by a single computer apparatus, or may be realized by distributing the respective functions to a plurality of computer apparatuses as necessary. The plurality of computer apparatuses are coupled to each other so as to be able to communicate.

The information processing apparatus 102 includes a control unit 201, a non-volatile memory 202, a working memory 203, a storage device 204, an input device 205, an output device 206, a network interface 207, and a system bus 208.

The control unit 201 includes an arithmetic processor such as a CPU or an MPU that controls the information processing apparatus 102 as a whole. The non-volatile memory 202 is a ROM that stores a program and parameters executed by the processor of the control unit 201. Here, the program is a program for executing the processing of first, second, and third embodiments described later. The working memory 203 is a RAM that temporarily stores programs and data supplied from an external apparatus or the like. The working memory 203 holds data obtained by executing control processing to be described later.

The storage device 204 is an internal device such as a hard disk or a memory card built in the information processing apparatus 102 or an external device such as a hard disk or a memory card detachably connected to the information processing apparatus 102. The storage device 204 includes a memory card, a hard disk, or the like, which is composed of a semiconductor memory, a magnetic disk, or the like. In addition, the storage device 204 includes a storage medium comprising a disk drive that reads and writes data from and to an optical disk such as a DVD, a Blue-ray Disc, or the like.

The input device 205 is an operation member such as a mouse, a keyboard, or a touch panel that receives a user operation, and outputs an operation instruction to the control unit 201. The output device 206 is a display apparatus such as a display or a monitor comprising an LCD or an organic EL, and displays data held by the information processing apparatus 102 and data supplied from the outside. The network interface 207 is communicably connected to a network such as the Internet or a LAN (Local Area Network). The system bus 208 includes an address bus, a data bus, and a control bus that connect the constituent elements 201 to 207 of the information processing apparatus 102 so as to enable exchange of data.

In the non-volatile memory 202, an OS (operating system), which is basic software executed by the control unit 201 and an application which realizes an applied function in cooperation with OS are recorded. Further, in the first embodiment, the non-volatile memory 202 stores an application by which the information processing apparatus 102 realizes control processing to be described later.

The control processing of the information processing apparatus 102 according to the first embodiment is realized by reading software provided by the application. It is assumed that the application has software for using basic functions of an OS installed in the information processing apparatus 102. Note that the OS of the information processing apparatus 102 may include software for realizing the control processing according to the first embodiment.

<Functional Configuration>

Next, referring to FIG. 3, functional blocks of the information processing apparatus 102 according to the first embodiment will be described.

Figure 3:
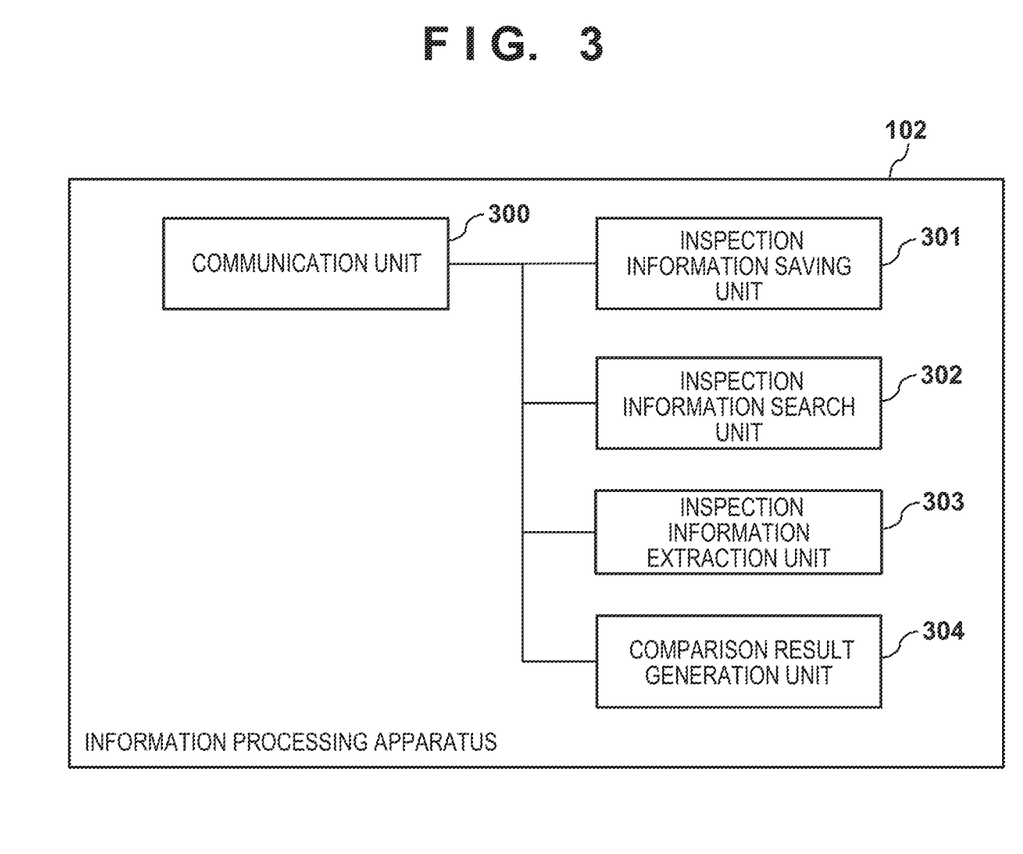
FIG. 3 is a functional block diagram of the information processing apparatus according to the first embodiment.

FIG. 3 is a functional block diagram of the information processing apparatus 102 according to the first embodiment.

The information processing apparatus 102 includes a communication unit 300, an inspection information saving unit 301, an inspection information search unit 302, an inspection information extraction unit 303, and a comparison result generation unit 304. Each function of the information processing apparatus 102 is configured by hardware and/or software. Each of the functional units may be configured as a system that is composed of one or a plurality of computer apparatuses or server apparatuses connected by a network. In addition, in a case when the functional units illustrated in FIG. 3 are configured by hardware instead of being implemented by software, a circuit configuration corresponding to each functional unit in FIG. 3 may be provided.

The communication unit 300 is communicably connected to the client apparatus 100, and receives, from the client apparatus 100, operation information corresponding to a user operation, search information necessary for searching for inspection information, and an input image obtained by capturing an inspection target. Further, the communication unit 300 transmits the comparison result generated by the comparison result generation unit 304 to the client apparatus 100. The client apparatus 100 presents the comparison result received from the information processing apparatus 102 to a user by displaying the comparison result on a display apparatus.

Figure 4:
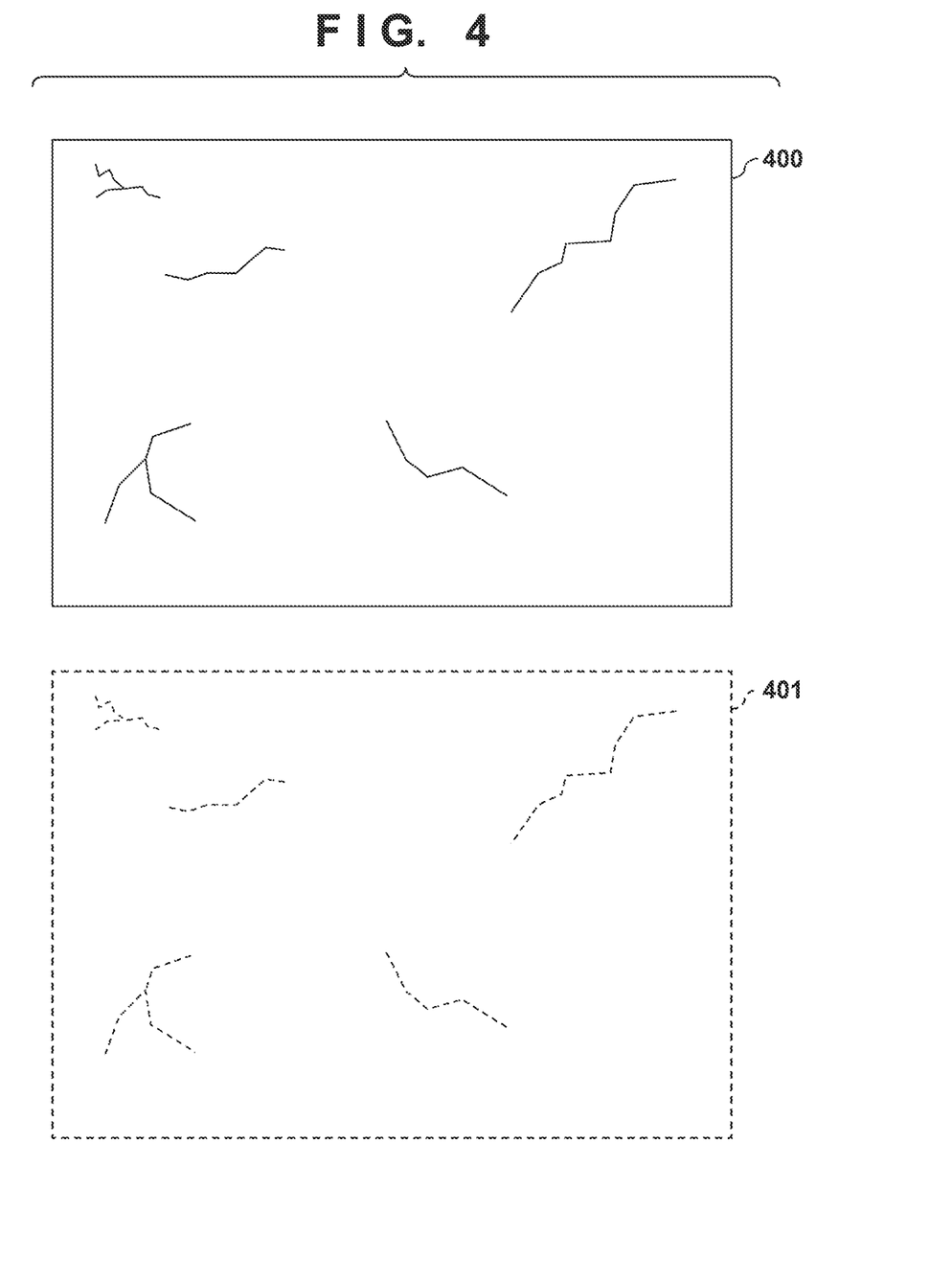
FIG. 4 is a diagram illustrating inspection information according to the first embodiment.

The inspection information saving unit 301 saves inspection information in which an inspection image obtained by capturing an inspection target and a defect region included in the inspection image are associated with each other. FIG. 4 illustrates inspection information. The inspection information includes an inspection image 400 and a defect region 401. The defect region 401 is information in which an inspection result of the inspection image 400 is recorded. The defect region 401 is information for specifying a portion where an inspection target such as a crack or rust exists, but the present invention is not limited thereto. Further, the inspection information is not limited to the example of FIG. 4, and may include, for example, supplementary information such as the image capturing date and time and the image capturing location of the inspection image, which is necessary for the inspection information search described later.

The inspection information search unit 302 searches for inspection information saved in the inspection information saving unit 304 based on search information received by the communication unit 300.

The inspection information extraction unit 303 extracts a partial region obtained by cutting out an inspection image and a defect region included in inspection information searched for by the inspection information search unit 302 based on the search information, and a partial defect region which is a defect region included in the partial region.

The comparison result generation unit 304 generates information for presenting the partial region and the partial defect region extracted by the inspection information extraction unit 303 so that they can be compared against an input image.

<Control Processing>

Next, control processing of the information processing apparatus 102 according to the first embodiment will be described with reference to FIG. 5.

Figure 5:
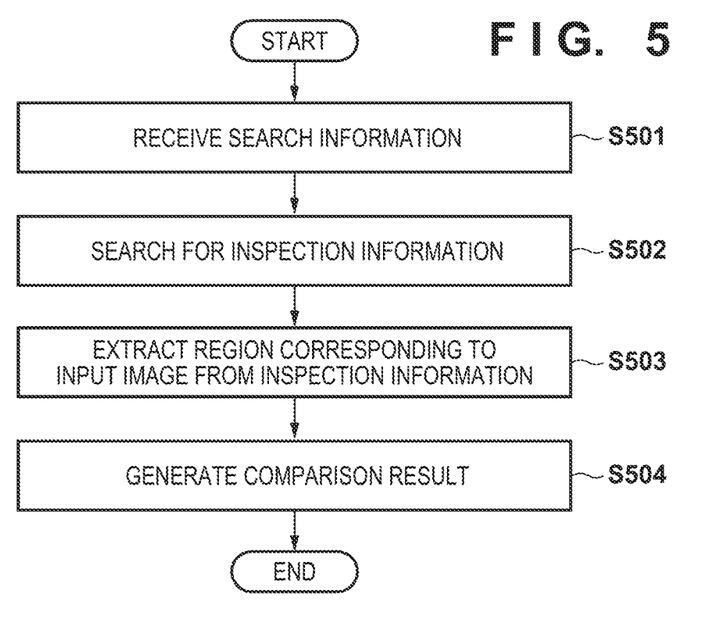
FIG. 5 is a flowchart illustrating control processing of the information processing apparatus according to the first embodiment.

The processing of FIG. 5 is realized by the control unit 201 of the information processing apparatus 102 illustrated in FIG. 2 loading a program stored in the non-volatile memory 202 into the working memory 203 and executing the program, and thereby controlling the respective components illustrated in FIG. 2 and operating as the respective functional units illustrated in FIG. 3. Further, the processing of FIG. 5 is started in a state where the information processing apparatus 102 is communicably connected to the client apparatus 100.

In step S501, the communication unit 300 receives search information and an input image from the client apparatus 100. The communication unit 300 outputs the search information to the inspection information search unit 302, and outputs the input image to the inspection information extraction unit 303 and the comparison result generation unit 304. The search information may include an input image obtained by capturing an inspection target, and may also include information such as position information and/or an image capturing direction and/or an image capturing angle at the time of image capturing of an inspection target obtained by the client apparatus 100, a defect region of the input image, or the like.

In step S502, the inspection information search unit 302 searches for inspection information saved in the inspection information saving unit 301 based on the search information acquired from the communication unit 300, and outputs a search result to the inspection information extraction unit 303. The search method is not limited to a specific search method, although the search for inspection information corresponding to the input image is performed by a known image searching method. For example, an identifier by which an inspection target can be uniquely identified may be set and saved as the supplementary information of the inspection information, and the search may be performed based on an inspection target identifier designated by a user operation as the search information. Further, position information such as spatial coordinates of the inspection target may be held as the inspection information, and the search may be conducted by narrowing down the search range based on the position information and/or information such as an image capturing direction and a capturing angle at the time of image capturing of the inspection target obtained by the client apparatus 100, as the search information. In addition, the search may be performed based on similarity between or feature amounts of the input image and the inspection information, or may be performed by narrowing down the search to a cracked part that that the user traces by an operation on the input image.

In step S503, the inspection information extraction unit 303 performs processing for extracting a partial region corresponding to a region of the input image from the inspection information searched for by the inspection information search unit 302. The extraction processing is performed, for example, by calculating the similarity between the pixel values of the input image and the pixel values of an inspection image and cutting out the region of the inspection image having the highest similarity as the partial region, but the present invention is not limited thereto and may be realized by other methods. For example, as in the search processing in step S502, position information such as spatial coordinates of the inspection target may be held as the inspection information, and the region may be extracted based on the position information of the inspection target and/or information such as the image capturing direction and/or the capturing angle at the time of image capturing of the inspection target obtained in the client apparatus 100, and the like, as the search information.

In addition, the inspection information extraction unit 303 extracts, as a partial defect region, a defect region included in the partial region cut out from the inspection image. In the extraction processing of the partial defect region, a configuration may be such that only a range included in the partial region is extracted, but the partial region may be extended to include a defect region when the defect region is not entirely encompassed therein.

Further, the extraction processing may be performed based on supplementary information of the inspection information. In a case when a degree of damage is held for each defect region as supplementary information of the inspection information, a configuration may be such that only defect regions having a degree of damage equal to or higher than a predetermined threshold are extracted. The threshold value may be changeable by a user operation of the client apparatus 100.

In step S504, the comparison result generation unit 304 generates a comparison result using the partial region and the partial defect region extracted by the inspection information extraction unit 303 and the input image, and transmits the comparison result to the client apparatus 100 via the communication unit 300. The comparison result is information by which the defect region of the input image and the defect region of the inspection image can be compared. The client apparatus 100 presents the comparison result received from the information processing apparatus 102 to the user by displaying the comparison result on the display apparatus.

Figure 6:
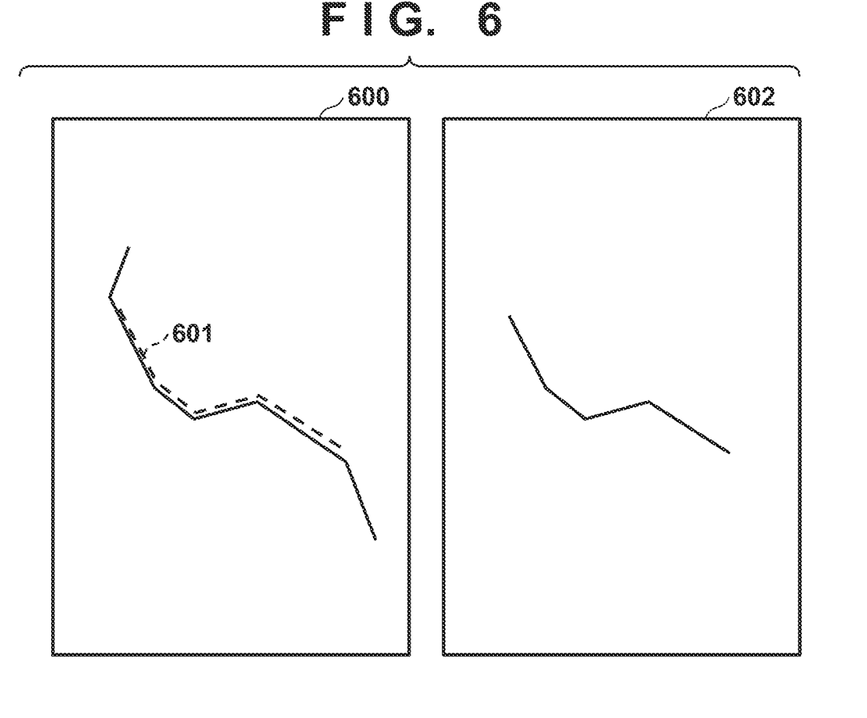
FIG. 6 is a diagram illustrating a comparison result according to the first embodiment.

FIG. 6 illustrates an example of a display of a comparison result. In the example of FIG. 6, the image obtained by superimposing a partial defect region 601 cut out from the inspection image onto an input image 600 and a partial region 602 are displayed side by side, but the comparison result is not limited to this. Further, supplementary information of the inspection information may be displayed in together with the partial defect region 601. Further, an image obtained by superimposing a partial defect region onto an input image and an image obtained by superimposing the partial region and the partial defect region may be switchable. Further, images obtained by superimposing the partial defect region onto the input image and the partial region may be displayed side by side. Further, the partial region and the partial defect region may be rotated, enlarged, or reduced in accordance with the image capturing direction of the input image, superimposed and displayed.

Further, a configuration may be taken such that it is possible to edit the partial defect region of the comparison result by a user operation. For example, the shape of the partial defect region superimposed and displayed may be changed with reference to the shape of a crack in the input image. In this case, the comparison result generation unit 304 may reflect the editing result in the inspection information used for the extraction.

In addition, a configuration may be such that not only the partial defect region, but also the supplementary information of the inspection information is editable. For example, in a case when a degree of damage is held as supplementary information of the inspection information, the degree of damage of the partial defect region superimposed and displayed may be changed with reference to the shape of a crack in the input image.

According to the first embodiment described above, by extracting the partial region and the partial defect region of the inspection image corresponding to the input image obtained by capturing the inspection target, the inspector can perform confirmation work that focuses on a region of interest.

Further, by displaying an image in which the partial defect region is superimposed onto the input image and the partial region of the inspection image side by side, the work of checking the inspection result can be performed by comparing the images, and therefore the user is enabled to perform the work of checking the inspection result efficiently.

Second Embodiment

In the second embodiment, an example in which the inspection information search results include a plurality of inspection information will be described.

The hardware configuration and the functional blocks of the information processing apparatus 102 according to the second embodiment are similar to those of the first embodiment illustrated in FIG. 2 and FIG. 3.

When the inspection information search unit 302 finds a plurality of pieces of inspection information corresponding to the input image, the inspection information extraction unit 303 performs processing to extract a partial region corresponding to the input image for each of the plurality of pieces of inspection information. As a result of the extraction processing, in a case when a partial defect region of a partial region corresponding to the input image extends over a plurality of pieces of inspection information, a partial region and a partial defect region extracted from the respective pieces of inspection information may be joined to form one partial region and one partial defect region. The joining method is performed by recording, as inspection information, a connection relationship between the inspection images and a connection relationship between defect regions as supplementary information, and using the connection relationships, but the present invention is not limited thereto.

Figure 7:
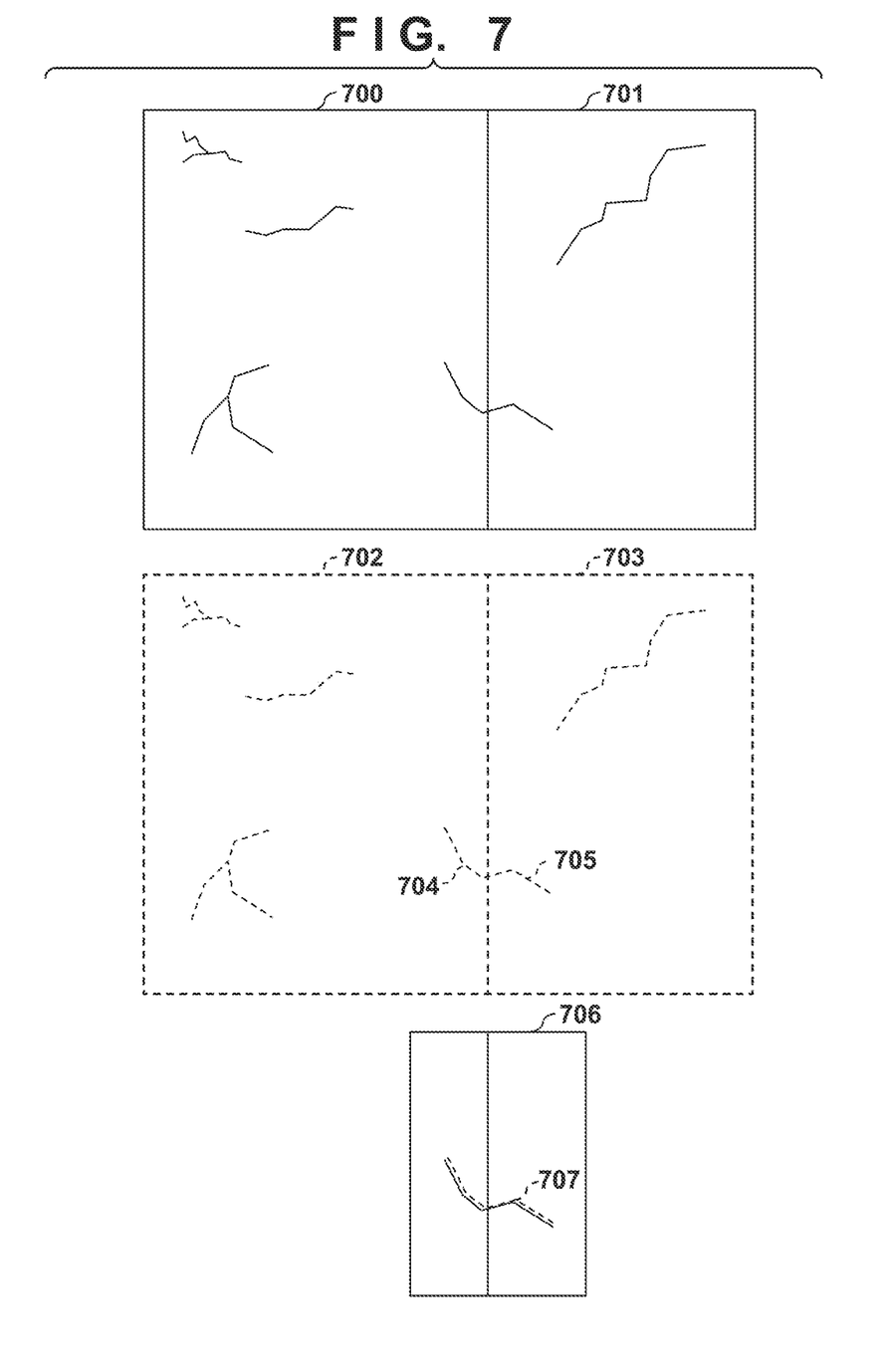
FIG. 7 is a diagram illustrating a method for joining partial regions and partial defect regions according to a second embodiment.

FIG. 7 illustrates a state in which partial regions and partial defect regions of a plurality of inspection images are joined. In the example of FIG. 7, partial defect regions 704 and 705 are extracted from defect regions 702 and 703 of inspection images 700 and 701 corresponding to the input image. Furthermore, a partial region 706 and a partial defect region 707 in which the partial defect regions 704 and 705 are joined are generated. Then, the comparison result generation unit 304 generates a comparison result using the generated partial region 706 and partial defect region 707 and the input image.

Figure 8:
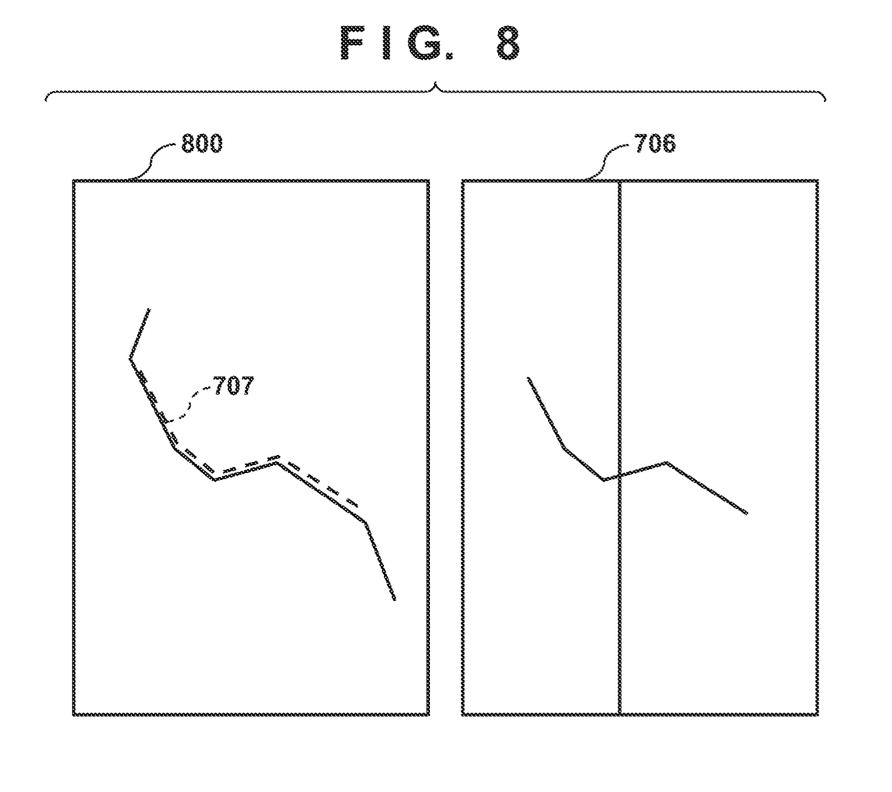
FIG. 8 is a diagram illustrating a comparison result according to the second embodiment.

FIG. 8 illustrates an example of a display of a comparison result according to the second embodiment. In the example of FIG. 8, the partial defect region 707 joined and generated as described in FIG. 7 is superimposed and displayed onto an input image 800, and the partial region 706 are displayed to the side thereof.

In addition, the comparison results may be generated without joining the plurality of partial regions and partial defect regions. In this case, a configuration may be such that it is possible to switch, by a user operation, the comparison result that is displayed.

According to the above described second embodiment, when a plurality of partial regions and partial defect regions are extracted from the inspection information corresponding to the input image obtained by capturing the inspection target, the comparison result can be generated based on the partial regions and the partial defect regions, which are respectively joined together, so as to enable the work of confirming the inspection result to be performed efficiently, similarly to in the first embodiment.

Third Embodiment

In the third embodiment, an example in which an inspection target and an inspection time are included as the supplementary information of the inspection information will be described.

The hardware configuration and the functional blocks of the information processing apparatus 102 according to the third embodiment are similar to those of the first embodiment illustrated in FIG. 2 and FIG. 3.

The inspection information saving unit 301 saves the inspection image and the defect region of the inspection image in association with each other as inspection information, and also saves the inspection target and the inspection time as supplementary information.

The inspection information search unit 302 searches for inspection information corresponding to the input image, and adds, to the search result, inspection information whose supplementary information has the same inspection target as the inspection information of the search result.

The inspection information extraction unit 303 performs extraction processing of regions corresponding to the input image from each piece of inspection information of the search result, and thereby extracts a partial region and a partial defect region.

The comparison result generation unit 304 generates a comparison result for each of the partial region and the partial defect region extracted by the inspection information extraction unit 303, and sorts the results chronologically using the inspection time which is supplementary information. Then, the comparison result generation unit 304 transmits the respective comparison results to the client apparatus 100 via the communication unit 300. The client apparatus 100 presents the comparison results received from the information processing apparatus 102 to the user by displaying each of the comparison results on the display apparatus. The display of the respective comparison results can be switched in order of inspection time in response to a user operation.

Figure 9A:
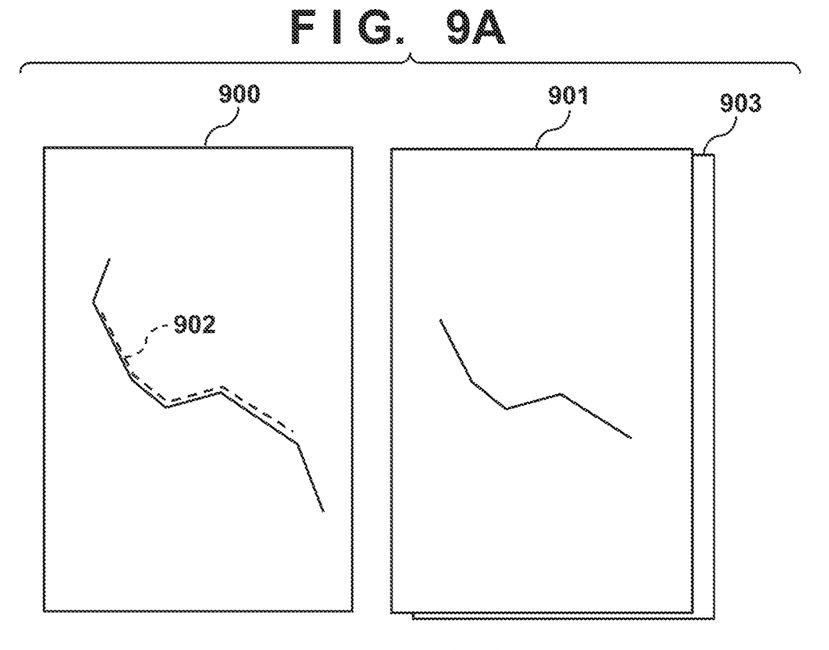
FIGS. 9A and 9B are diagrams illustrating a comparison result according to a third embodiment.
Figure 9B:
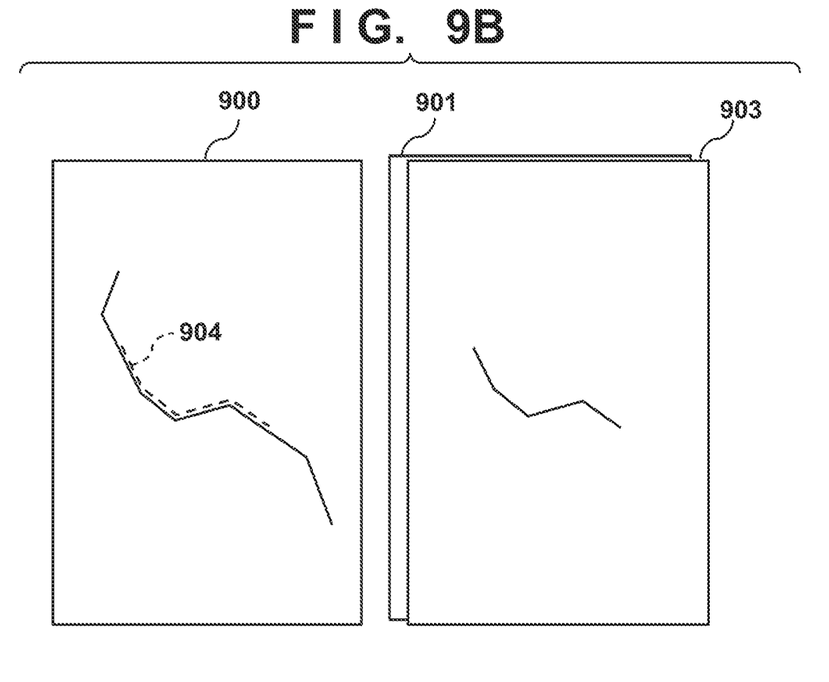

FIGS. 9A and 9B illustrate an example of a display of comparison results according to the third embodiment. In the example of FIG. 9A, a partial region 901 having a newer inspection time and a partial region 903 having an older inspection time are displayed side by side to an input image 900, and a partial defect region 902 corresponding to the partial region 901 is superimposed and displayed onto the input image 900. Further, in the example of FIG. 9A, the partial region 901 is displayed in the foreground, and the partial region 903 is displayed behind the partial region 901.

In the example of FIG. 9B, the partial region 901 having the newer inspection time and the partial region 903 having the older inspection time are displayed side by side to the input image 900, and a partial defect region 904 corresponding to the partial region 903 is superimposed and displayed onto the input image 900. Further, in the example of FIG. 9B, the partial region 903 is displayed in the foreground, and the partial region 901 is displayed behind the partial region 903.

The display state of FIG. 9A and the display state of FIG. 9B can be switched according to a user operation. The present invention is not limited to the comparison results of FIGS. 9A and 9B, and may be applied to a case in which the input image and the partial regions and partial defect regions of each of the inspection times are displayed side by side.

According to the third embodiment described above, since the comparison results can be switched and displayed in order of the inspection time for the input image obtained by capturing the inspection target, the work of confirming the inspection result is enabled to be efficiently performed, and change over time of a defect can be confirmed.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
one or more memories storing instructions; and
one or more processors executing the instructions:
to search for inspection information in which a first image in which an inspection target is captured and a defect region of the first image are associated, the inspection information corresponding to a second image in which the inspection target is captured;

to extract a region corresponding to the second image from the searched inspection information corresponding to the second image;

to generate information for presenting the extracted region corresponding to the second image so that the region is comparable against the second image, and to associate and to save, as inspection information, the first image and the defect region of the first image, wherein the saved inspection information corresponding to the second image is searched for, a partial region of the first image corresponding to the second image and a partial defect region included in the partial region are extracted from the searched inspection information corresponding to the second image, and information for presenting the extracted partial region and the extracted partial defect region comparably against the second image is generated.

2. The information processing apparatus according to claim 1, wherein position information of the defect region of the first image is saved as the inspection information, and the saved inspection information is searched for based on the second image and position information of the second image.

3. The information processing apparatus according to claim 1, wherein supplementary information of the defect region of the first image is saved as the inspection information, and the region corresponding to the second image is extracted from the inspection information corresponding to the second image, which is searched for based on the supplementary information.

4. The information processing apparatus according to claim 1, wherein the information for presenting the extracted partial region and the extracted partial defect region comparably includes an image in which the extracted partial defect region is superimposed onto the second image and an image of a partial region of the first image is displayed side by side with the second image.

5. The information processing apparatus according to claim 1, wherein the partial region is cut out so that a defect region present in the partial region of the first image corresponding to the second image is completely encompassed.

6. The information processing apparatus according to claim 1, wherein the one or more processors further execute the instructions to edit the partial defect region, and
wherein a result of editing the edited partial defect region is reflected in inspection information used for extraction.

7. The information processing apparatus according to claim 1, wherein a connection relationship of a plurality of partial regions and a connection relationship of a plurality of partial defect regions are saved as supplementary information of the inspection information,
partial defect regions are extracted from a plurality of pieces of searched inspection information corresponding to the second image, respectively, and
the plurality of extracted partial defect regions are joined based on the connection relationships.

8. The information processing apparatus according to claim 1, wherein the partial defect regions are extracted from the plurality of pieces of searched inspection information corresponding to the second image, respectively,
a plurality of pieces of information by which the plurality of extracted partial defect regions are comparable against the second image are generated, and
the plurality of pieces of information are switchable by a user operation.

9. The information processing apparatus according to claim 1, wherein an inspection target and an inspection time are saved as supplementary information of the inspection information,
inspection information of an inspection time that is different for the same inspection target is searched for based on supplementary information of the saved inspection information corresponding to the second image,
the partial region and the partial defect region of the first image corresponding to the second image are extracted from the searched inspection information corresponding to the second image, the inspection information being of a different inspection time, and
information by which a plurality of extracted partial defect regions are comparable against the second image in order of the inspection time is generated.

10. The information processing apparatus according to claim 9, wherein a plurality of partial regions of the first images are displayed side by side with the second image overlapping in order of the inspection time, and
a partial defect region of a partial region positioned frontmost among the plurality of partial regions of the first images is displayed superimposed onto the defect region of the second image.

11. The information processing apparatus according to claim 1, wherein the first image is an image in which the inspection target has been captured in the past, the second image is an image in which the same inspection target as the inspection target of the first image is captured, and
the one or more processors further execute the instructions to transmit the generated information to a client apparatus that is capable of communicating with the information processing apparatus.

12. An information processing method comprising:
searching for inspection information in which a first image in which an inspection target is captured and a defect region of the first image are associated, the inspection information corresponding to a second image in which the inspection target is captured;
extracting a region corresponding to the second image from the searched inspection information corresponding to the second image;
generating information for presenting the extracted region corresponding to the second image so that the region is comparable against the second image; and
associating and saving, as inspection information, the first image and the defect region of the first image,
wherein the saved inspection information corresponding to the second image is searched for, a partial region of the first image corresponding to the second image and a partial defect region included in the partial region are extracted from the searched inspection information corresponding to the second image, and information for presenting the extracted partial region and the extracted partial defect region comparably against the second image is generated.

13. A non-transitory computer-readable storage medium storing a program for causing a computer to execute an information processing method, the method comprising:
searching for inspection information in which a first image in which an inspection target is captured and a defect region of the first image are associated, the inspection information corresponding to a second image in which the inspection target is captured;

extracting a region corresponding to the second image from the searched inspection information corresponding to the second image;

generating information for presenting the extracted region corresponding to the second image so that the extracted region is comparable against the second image; and associating and saving, as inspection information, the first image and the defect region of the first image, wherein the saved inspection information corresponding to the second image is searched for, a partial region of the first image corresponding to the second image and a partial defect region included in the partial region are extracted from the searched inspection information corresponding to the second image, and information for presenting the extracted partial region and the extracted partial defect region comparably against the second image is generated.

* * * * *